(12) United States Patent
Barndt et al.

(10) Patent No.: US 12,692,708 B2
(45) Date of Patent: Jul. 28, 2026

(54) BATH OR SHOWER ENCLOSURE WALLS

(71) Applicant: Project Soak, LLC, Irving, TX (US)

(72) Inventors: Ronald D. Barndt, Bethlehem, PA (US); Matthew Kuhns, Youngstown, OH (US); Corey Michael Peterson, Bordentown, NJ (US); Christophe Bucher, Hillsborough, NJ (US)

(73) Assignee: Project Soak, LLC, Irving, TX (US)

( * ) Notice: Subject to any disclaimer, the term of this patent is extended or adjusted under 35 U.S.C. 154(b) by 254 days.

(21) Appl. No.: 18/562,785

(22) PCT Filed: May 25, 2022

(86) PCT No.: PCT/US2022/030838
§ 371 (c)(1),
(2) Date: Nov. 20, 2023

(87) PCT Pub. No.: WO2022/251301
PCT Pub. Date: Dec. 1, 2022

(65) Prior Publication Data
US 2024/0229473 A1 Jul. 11, 2024

Related U.S. Application Data

(60) Provisional application No. 63/193,930, filed on May 27, 2021.

(51) Int. Cl.
*E04F 13/18* (2006.01)
*B29L 31/00* (2006.01)
(Continued)

(52) U.S. Cl.
CPC ........ *E04F 13/185* (2013.01); *E04F 13/0871* (2013.01); *E04F 13/0873* (2013.01);
(Continued)

(58) Field of Classification Search
CPC ... E04F 13/147; E04F 13/185; E04F 13/0871; E04F 13/0873; E04C 2002/005; B32B 2419/04
See application file for complete search history.

(56) References Cited

U.S. PATENT DOCUMENTS 9,518,392 B2 * 12/2016 Morneau ................. E04F 13/00
2006/0251864 A1 11/2006 Bordener
(Continued)

OTHER PUBLICATIONS

PCT/US2022/030838 International Search Report, Dated Aug. 18, 2022.

*Primary Examiner* — Andrew J Triggs
(74) *Attorney, Agent, or Firm* — Bradley Arant Boult Cummings LLP; Phillip E. Walker; Alex H. Huffstutter

(57) ABSTRACT

A thermoplastic panel for a bath or shower wall, comprising at least one thermoformed thermoplastic layer, wherein the thermoplastic panel comprises a front side and a back side, the front side is configured to be visible and face an interior space, and comprises a tile pattern having a plurality of recessed grout lines surrounding a plurality of raised tile surfaces, the back side comprises a complimentary pattern having a plurality of raised grout lines surrounding a plurality of recessed tile surfaces, and wherein the thermoplastic panel back side raised grout lines comprises two or more protruding parallel surfaces.

20 Claims, 3 Drawing Sheets

(51) Int. Cl.
     *E04C 2/00*          (2006.01)
     *E04F 13/08*        (2006.01)

(52) U.S. Cl.
     CPC ... *B29L 2031/7696* (2013.01); *B32B 2419/04*
                 (2013.01); *E04C 2002/005* (2013.01)

(56)               References Cited

U.S. PATENT DOCUMENTS

| | | |
|---|---|---|
| 2008/0115437 A1 | 5/2008 | Bordener |
| 2010/0170035 A1 | 7/2010 | Kik, Sr. et al. |
| 2014/0331585 A1 | 11/2014 | Morneau |
| 2020/0141128 A1 | 5/2020 | Webi |
| 2024/0229473 A1* | 7/2024 | Barndt .................. E04F 13/185 |

* cited by examiner

BATH OR SHOWER ENCLOSURE WALLS

The disclosure is directed to patterned thermoformed bath or shower enclosure walls and methods of manufacture.

BACKGROUND

Tiles have traditionally been employed for bathroom walls and floors, including walls of bathtub and shower enclosures. Tiling a bath or shower enclosure, and grouting joints between tiles, is labor intensive and time consuming. Desired are lightweight bath or shower enclosure walls that easy to install, and that also have an aesthetic tile look.

SUMMARY

Accordingly, disclosed is a thermoplastic panel for a bath or shower wall, comprising at least one thermoformed thermoplastic layer, wherein the thermoplastic panel comprises a front side and a back side, the thermoplastic panel front side is configured to be visible and face an interior space, the thermoplastic panel front side comprises a tile pattern having a plurality of recessed grout lines around a plurality of raised tile surfaces, the thermoplastic panel back side is configured to not be visible and face away from the interior space, and the thermoplastic panel back side comprises a complimentary inverse pattern having a plurality of raised grout lines around a plurality of recessed tile surfaces, and wherein the thermoplastic panel back side raised grout lines comprises two or more protruding parallel surfaces.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DISCLOSURE

Figures 1A, 1B:
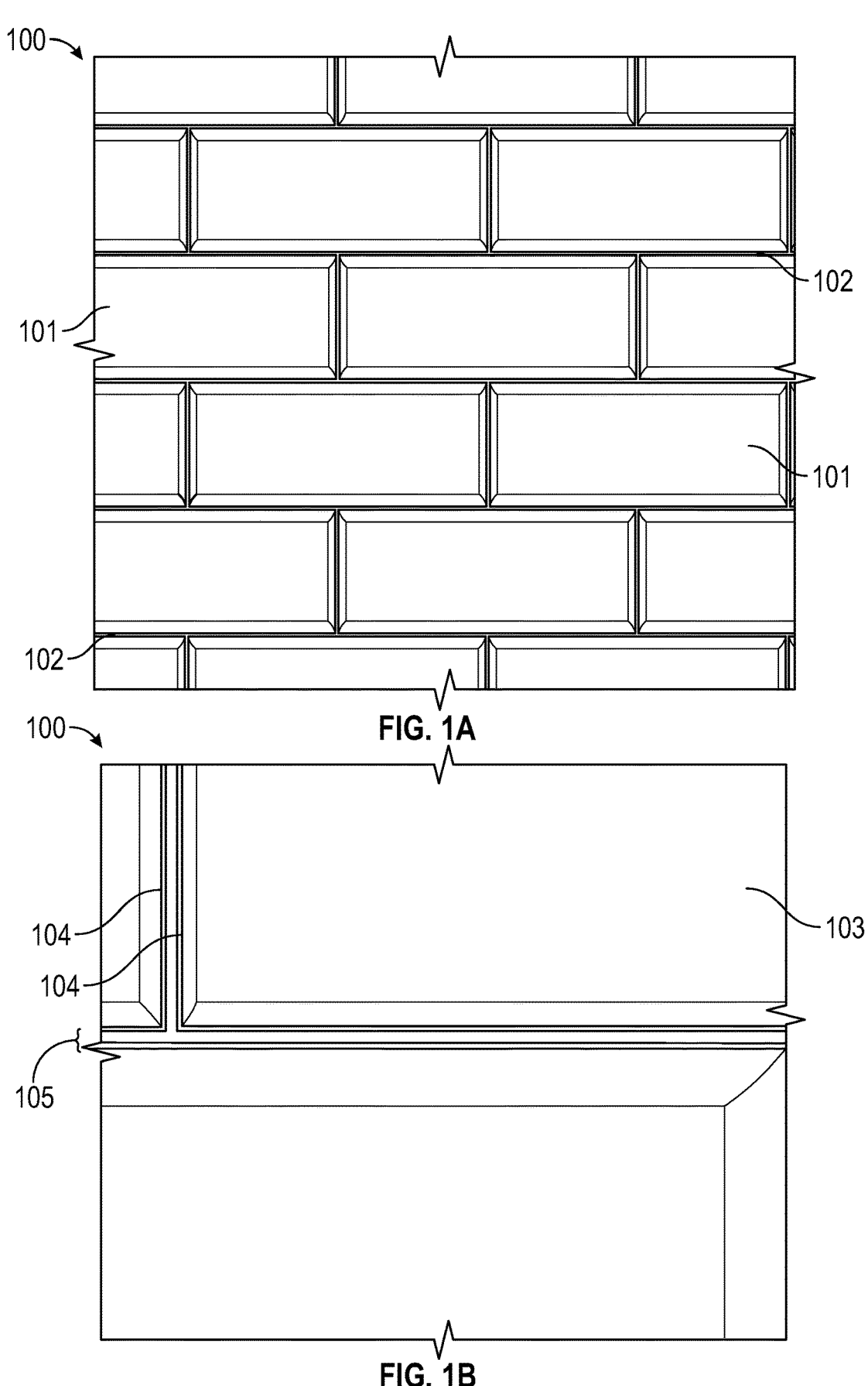
FIG. 1A shows a thermoplastic panel front side having a tile pattern, according to an embodiment.
FIG. 1B shows a thermoplastic panel back side, according to an embodiment.

FIG. 1A and FIG. 1B show thermoplastic panel 100 front side and back side, respectively, according to some embodiments. Panel 100 front side exhibits a tile pattern having tiles 101 surrounded by recessed grout lines 102. Panel 100 front side exhibits high gloss and sharp aesthetic grout lines, and is configured to be visible upon installation in a bath or shower enclosure. Panel 100 back side comprises a complimentary pattern to the front side, having recessed tile surfaces 103 and raised grout lines 105. Raised grout lines 105 have protruding parallel surfaces 104 positioned towards outer edges of grout lines 105. Panel 100 front side, FIG. 1A, is configured to face a bath or shower interior, and back side, FIG. 1B is configured to face a bath or shower wall.

Figures 2A, 2B:
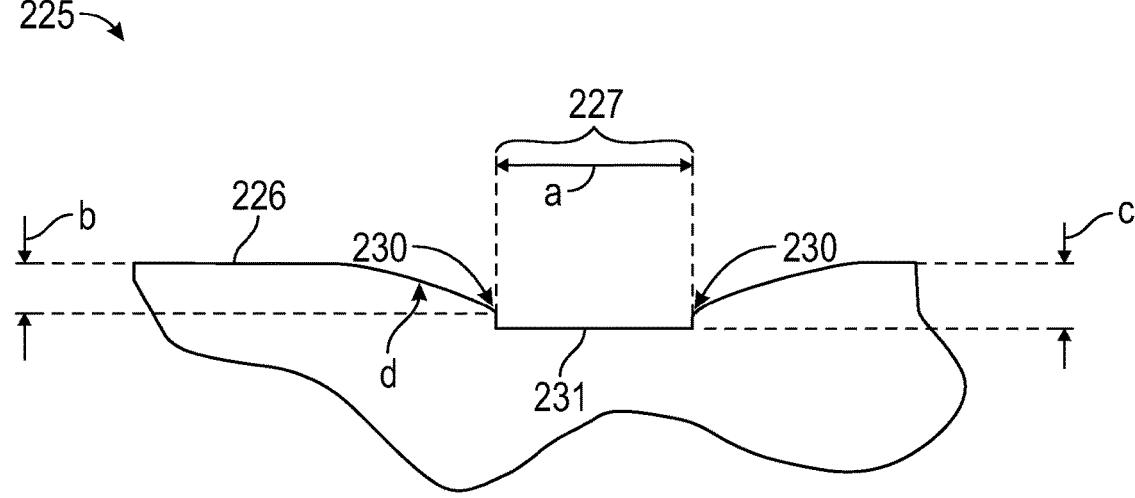
FIG. 2A and FIG. 2B show a portion of a comparative thermoplastic panel.

FIG. 2A and FIG. 2B show a portion of comparative thermoplastic panel 225, from a side or edge perspective, according to an embodiment. Panel back side 228 comprises raised grout lines 227 and recessed tile surfaces 226. Panel front side 229 comprises recessed grout lines 227 and raised tile surfaces 226. Grout lines 227 have a width (a) of about 6.1 mm, and a depth (c) of about 2.0 mm. Width (a) is measured from inflection points 230 at beginning edge of transition angle (d) where a grout line transitions to a tile face. Depth (c) is measured from tile face 226 to grout line 227 bottom surface 231. Depth (b) is about 1.5 mm, measured from tile face 226 to inflection point 230.

Figure 3A:
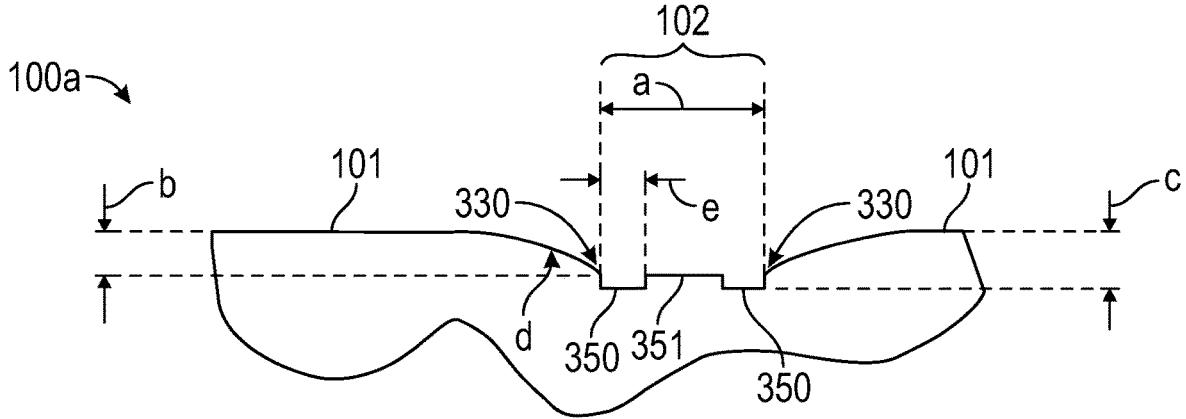
FIG. 3A, FIG. 3B, and FIG. 3C show a portion of a thermoplastic panel, according to some embodiments.
Figure 3B:
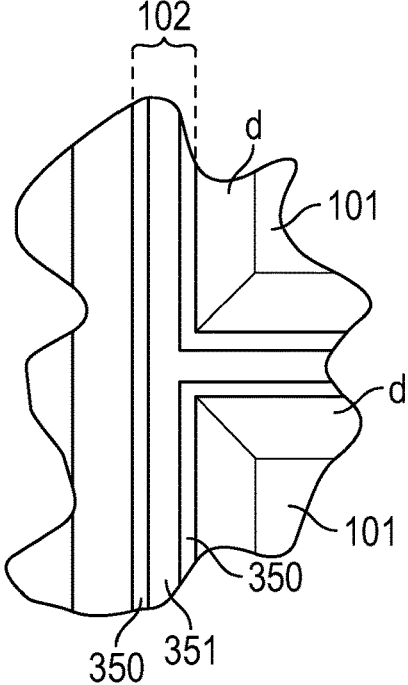
Figure 3C:
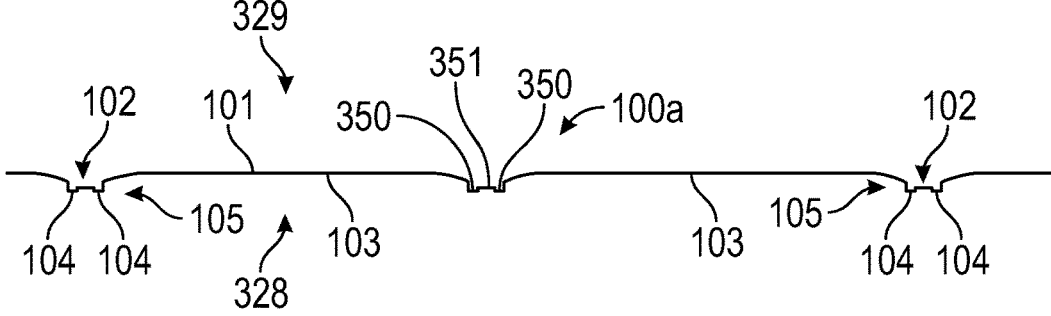

FIG. 3A, FIG. 3B, and FIG. 3C depict thermoplastic panel portion 100a, from a side or edge perspective, according to some embodiments. Panel back side 328 comprises raised grout lines 105 and recessed tile surfaces 103. Raised grout lines 105 comprise protruding parallel surfaces 104. FIG. 3B shows a front view, where grout lines 102, raised tile surfaces 101, transition angles (d), grooves 350, and grout line intermediate surfaces 351 are depicted. Grooves 350 and protruding surfaces 104 comprise a rectangular shape. Width (a) of grout line 102 is about 5.9 mm, and width (e) of grooves 350 is about 1.5 mm. A width of raised grout line 105 will be the same as the width of recessed grout line 102. Depth of grooves 350 (largest depth of grout line (c)), is about 2.0 mm, intermediate depth (b) is about 1.5 mm. Largest depth (c) is measured from tile face 101 to groove bottom surface 350 and intermediate depth (b) is measured from tile face 101 to intermediate surface 351. Width (a) is measured from inflection points 330 at beginning edges of transition angles (d). Thermoplastic panel 100 comprises superior gloss and sharp, clean grout lines. In some embodiments, an intermediate surface and/or a groove bottom surface may be substantially parallel planar relative to a tile face. "Parallel planar" meaning the planes, as shown in FIG. 3A, are substantially parallel.

In some embodiments, panels are configured for one to install over a bathtub or a shower base. Panels may be prepared via vacuum thermoforming techniques, wherein a thermoplastic material is heated above a mold surface. At a proper heating point, a softened thermoplastic sheet is brought into contact with the mold surface and placed under reduced pressure. Mold surfaces may be designed with micro roughness, which provide venting pathways for air to escape between a thermoplastic and the mold and to provide high contact area between a thermoplastic and the mold. A thermoplastic is then cooled to provide the final panel.

It is difficult to prepare a thermoplastic panel having high gloss and an aesthetic tile look with sharp grout lines. High gloss is not possible if a panel front or "A" side is contacted with a mold, and sharp tile grout lines are difficult to obtain if a panel rear or "B" side is contacted with a mold. The present invention allows for vacuum thermoforming a bath or shower panel on a rear or "B" side, thus providing panels having high gloss as well as sharp, well-defined grout lines. A mold may comprise a metal, for example aluminum.

In some embodiments, a visible recessed grout line may have a largest depth of from any of about 0.5 mm, about 0.8 mm, about 1.1 mm, about 1.4 mm, about 1.7 mm, about 2.0 mm, or about 2.3 mm, to any of about 2.6 mm, about 2.9 mm, about 3.2 mm, about 3.5 mm, about 4.0 mm, or more.

In some embodiments, a visible recessed grout line may have intermediate depth of from any of about 0.2 mm, about 0.5 mm, about 0.8 mm, about 1.1 mm, about 1.4 mm, about 1.7 mm, or about 2.0 mm, to any of about 2.3 mm, about 2.6 mm, about 2.9 mm, about 3.2 mm, about 3.5 mm, or more.

An intermediate depth of a visible recessed grout line will have a lesser depth than a largest depth.

In some embodiments, a visible recessed grout line may have a width of from any of about 2.0 mm, about 2.3 mm, about 2.6 mm, about 2.9 mm, about 3.1 mm, about 3.4 mm, or about 3.7 mm, to any of about 4.0 mm, about 4.3 mm, about 4.7 mm, about 5.0 mm, about 5.3 mm, about 5.6 mm, about 5.9 mm, about 6.2 mm, about 6.5 mm, about 6.8 mm, about 7.1 mm, about 7.4 mm, about 7.7 mm, about 8.0 mm, about 8.3 mm, about 8.6 mm, about 8.9 mm, about 9.2 mm, about 9.5 mm, about 9.8 mm, or more.

In some embodiments, a visible recessed grout line groove may have a width of from any of about 0.2 mm, about 0.5 mm, about 0.8 mm, about 1.1 mm, about 1.4 mm, about 1.7 mm, or about 2.0 mm, to any of about 2.3 mm, about 2.6 mm, about 2.9 mm, about 3.2 mm, about 3.5 mm, or more.

In some embodiments panels may comprise a thickness of from any of about 1.7 mm, about 1.9 mm, about 2.0 mm, about 2.1 mm, about 2.3 mm, about 2.4 mm, or about 2.5 mm, to any of about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, about 3.7 mm, about 3.9 mm, about 4.1 mm, about 4.3 mm, about 4.5 mm, about 4.7 mm, about 5.0 mm, or more. Panel thickness may be considered an average thickness taken over multiple locations at any point.

Measures of grout line width and depth may represent an average of measures taken over multiple locations. Depth of a grout line is measured from a tile face. Width of a grout line is measured between inflection points where a grout line begins to form an angle towards a tile face.

In some embodiments, grout line grooves and complimentary back side protruding surfaces may have a generally rectangular shape. In other embodiments, grooves and protruding surfaces may have a triangular shape, an arc shape, or other shapes.

In some embodiments, grooves may be positioned towards outer edges of a grout line. In some embodiments, an outer edge of a groove may be positioned at or near an inflection point where the panel surface angles and transitions towards a planar tile surface.

In some embodiments, at least one thermoformed thermoplastic layer comprises a thermoplastic selected from polyvinylchloride (PVC), acrylonitrile-butadiene-styrene copolymer (ABS), a poly(meth)acrylate, a polystyrene (PS), a polyolefin, a polyamide, or a polyester. Polyolefins include polypropylene (PP), polyethylene (PE), blends thereof and copolymers thereof. Polystyrenes include polystyrene and styrene copolymers, such as high impact polystyrene (HIPS).

Following are some non-limiting aspects of the disclosure.

In a first embodiment, disclosed is a thermoplastic panel for a bath or shower wall, comprising at least one thermoformed thermoplastic layer, wherein the thermoplastic panel comprises a front side and a back side, the thermoplastic panel front side is configured to be visible and face an interior space, the thermoplastic panel front side comprises a tile pattern having a plurality of recessed grout lines surrounding a plurality of raised tile surfaces, the thermoplastic panel back side is configured to face away from the interior space, and the thermoplastic panel back side comprises a complimentary pattern having a plurality of raised grout lines surrounding a plurality of recessed tile surfaces, and wherein the thermoplastic panel back side raised grout lines comprises two or more protruding parallel surfaces. In an embodiment, two or more protruding parallel surfaces may have a "line" appearance.

In a second embodiment, disclosed is a thermoplastic panel according to the first embodiment, wherein the back side raised grout lines comprise two protruding parallel surfaces, wherein each protruding parallel surface is positioned towards an opposing outer edge of the grout lines.

In a third embodiment, disclosed is a thermoplastic panel according to embodiments 1 or 2, wherein the front side recessed grout lines comprise two or more grooves corresponding to the back side two or more protruding parallel surfaces.

In a fourth embodiment, disclosed is a thermoplastic panel according to any of the preceding embodiments, wherein the recessed grout lines comprise a largest depth and an intermediate depth, the largest depth being greater than the intermediate depth.

In a fifth embodiment, disclosed is a thermoplastic panel according to any of the preceding embodiments, wherein the recessed grout lines comprise an intermediate surface and two or more groove surfaces.

In a sixth embodiment, disclosed is a thermoplastic panel according to any of the preceding embodiments, wherein a largest depth of the recessed grout lines is from about 0.5 mm to about 4.0 mm.

In a seventh embodiment, disclosed is a thermoplastic panel according to any of the preceding embodiments, wherein an intermediate depth of the recessed group lines is from about 0.2 mm to about 3.5 mm. In an eighth embodiment, disclosed is a thermoplastic panel according to any of the preceding embodiments, wherein a width of the recessed grout lines is from about 2.0 mm to about 9.8 mm. In a ninth embodiment, disclosed is a thermoplastic panel according to any of the preceding embodiments, wherein a width of the grooves is from about 0.2 mm to about 3.5 mm In a tenth embodiment, disclosed is a thermoplastic panel according to any of the preceding embodiments, wherein the back side protruding parallel surfaces comprise a rectangular shape, a triangular shape, or an arc shape.

In an eleventh embodiment, disclosed is a thermoplastic panel according to any of the preceding embodiments, comprising a single thermoformed thermoplastic layer. In a twelfth embodiment, disclosed is a thermoplastic panel according to any of embodiments 1 to 10, comprising two or more thermoformed thermoplastic layers.

In a thirteenth embodiment, disclosed is a thermoplastic panel according to any of the preceding embodiments, prepared via vacuum thermoforming. In a fourteenth embodiment, disclosed is a thermoplastic panel according to any of the preceding embodiments, wherein the at least one thermoformed thermoplastic layer comprises polyvinylchloride, acrylonitrile-butadiene-styrene copolymer, a poly(meth)acrylate, a polystyrene, a polyolefin, a polyamide, or a polyester. In a fifteenth embodiment, disclosed is a thermoplastic panel according to any of the preceding embodiments, wherein the panel comprises an average thickness of from about 1.7 mm to about 5.0 mm.

In a sixteenth embodiment, disclosed is a method for preparing a thermoplastic panel according to any of the preceding embodiments, comprising contacting a back side of a thermoplastic sheet to a mold under vacuum thermoforming conditions, wherein the mold comprises a plurality of raised surfaces surrounded by a plurality of recessed surfaces, and wherein the recessed surfaces comprise two or more grooves.

In a seventeenth embodiment, disclosed is a method according to embodiment sixteen wherein the thermoplastic sheet comprises a single thermoplastic layer. In an eighteenth embodiment, disclosed is a method according to embodiments sixteen or seventeen, wherein the thermoplastic sheet comprises polyvinylchloride, acrylonitrile-butadiene-styrene copolymer, a poly(meth)acrylate, a polystyrene, a polyolefin, a polyamide, or a polyester. In a nineteenth embodiment, disclosed is a method according to embodiments 16-18, wherein the thermoplastic sheet comprises an average thickness of from about 1.7 mm to about 5.0 mm.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other. The term "positioned on" may mean "coupled to".

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A thermoplastic panel for a bath or shower wall, comprising at least one thermoformed thermoplastic layer, wherein the thermoplastic panel comprises a front side and a back side, the thermoplastic panel front side is configured to be visible and face an interior space, the thermoplastic panel front side comprises a tile pattern having a plurality of recessed grout lines surrounding a plurality of raised tile surfaces,

each of the plurality of recessed grout lines includes two laterally spaced recessed groove surfaces and a raised intermediate surface positioned between the two recessed groove surfaces, the raised intermediate surface is elevated relative to the two recessed groove surfaces and recessed relative to the raised tile surfaces, the two recessed groove surfaces and the raised intermediate surface are each planar surfaces, the thermoplastic panel back side is configured to face away from the interior space, and the thermoplastic panel back side comprises a complimentary pattern having a plurality of raised grout lines surrounding a plurality of recessed tile surfaces, and the thermoplastic panel back side raised grout lines comprises two or more protruding parallel surfaces.

2. The thermoplastic panel according to claim 1, wherein the back side raised grout lines comprise two protruding parallel surfaces, wherein each protruding parallel surface is positioned towards an opposing outer edge of the grout lines.

3. The thermoplastic panel according to claim 1, wherein the front side recessed grout lines comprise two or more grooves corresponding to the back side two or more protruding parallel surfaces.

4. The thermoplastic panel according to claim 1, wherein the recessed grout lines comprise a largest depth and an intermediate depth, the largest depth being greater than the intermediate depth.

5. The thermoplastic panel according to claim 4, wherein the largest depth corresponds to the two recessed groove surfaces and the intermediate depth corresponds to the raised intermediate surface.

6. The thermoplastic panel according to claim 1, wherein the raised intermediate surface, the two recessed groove surfaces, and the raised tile surfaces are substantially planar and parallel to one another.

7. The thermoplastic panel according to claim 1, wherein a largest depth of the recessed grout lines is from about 0.5 mm to about 4.0 mm.

8. The thermoplastic panel according claim 1, wherein an intermediate depth of the recessed grout lines is from about 0.2 mm to about 3.5 mm.

9. The thermoplastic panel according to claim 1, wherein a width of the recessed grout lines is from about 2.0 mm to about 9.8 mm.

10. The thermoplastic panel according to claim 1, wherein a width of the recessed grout lines is from about 0.2 mm to about 3.5 mm.

11. The thermoplastic panel according to claim 1, wherein the back side protruding parallel surfaces comprise a rectangular shape, a triangular shape, or an arc shape.

12. The thermoplastic panel according to claim 1, comprising a single thermoformed thermoplastic layer.

13. The thermoplastic panel according to claim 1, comprising two or more thermoformed thermoplastic layers.

14. The thermoplastic panel according to claim 1, prepared via vacuum thermoforming.

15. The thermoplastic panel according to claim 1, wherein the at least one thermoformed thermoplastic layer comprises polyvinylchloride, acrylonitrile-butadiene-styrene copolymer, a poly(meth)acrylate, a polystyrene, a polyolefin, a polyamide, or a polyester.

16. The thermoplastic panel according to claim 1, wherein the panel comprises an average thickness of from about 1.7 mm to about 5.0 mm.

17. A method for preparing a thermoplastic panel according to claim 1, the method comprising contacting a back side of a thermoplastic sheet to a mold under vacuum thermoforming conditions, wherein the mold comprises a plurality of raised surfaces surrounded by a plurality of recessed surfaces, and wherein the recessed surfaces comprise two or more grooves.

18. The method according to claim 17, wherein the thermoplastic sheet comprises a single thermoplastic layer.

19. The method according to claim 17, wherein the thermoplastic sheet comprises polyvinylchloride, acrylonitrile-butadiene-styrene copolymer, a poly(meth)acrylate, a polystyrene, a polyolefin, a polyamide, or a polyester.

20. The method according to claim 17, wherein the thermoplastic sheet comprises an average thickness of from about 1.7 mm to about 5.0 mm.

\* \* \* \* \*